(12) United States Patent
Yan

(10) Patent No.: US 9,191,402 B2
(45) Date of Patent: Nov. 17, 2015

(54) DOMAIN CLASSIFICATION BASED ON CLIENT REQUEST BEHAVIOR

(71) Applicant: OpenDNS, Inc., San Francisco, CA (US)

(72) Inventor: Ping Yan, San Francisco, CA (US)

(73) Assignee: OpenDNS, Inc., San Francisco, CA (US)

(*) Notice: Subject to any disclaimer, the term of this patent is extended or adjusted under 35 U.S.C. 154(b) by 0 days.

(21) Appl. No.: 13/750,712

(22) Filed: Jan. 25, 2013

(65) Prior Publication Data

US 2014/0215628 A1    Jul. 31, 2014

(51) Int. Cl.
H04L 29/06    (2006.01)
H04L 29/12    (2006.01)

(52) U.S. Cl.
CPC ........ H04L 63/1433 (2013.01); H04L 61/1511 (2013.01); H04L 63/1425 (2013.01); H04L 63/1441 (2013.01)

(58) Field of Classification Search
USPC ........................................................ 726/25
See application file for complete search history.

(56) References Cited

U.S. PATENT DOCUMENTS

| | | | |
|---|---|---|---|
| 6,285,999 | B1 | 9/2001 | Page |
| 6,799,176 | B1 | 9/2004 | Page |
| 7,058,628 | B1 | 6/2006 | Page |
| 7,269,584 | B2 | 9/2007 | Settle, III |
| 7,991,710 | B2 | 8/2011 | Palatucci et al. |
| 8,321,935 | B1 | 11/2012 | Chen et al. |
| 2007/0198603 | A1 | 8/2007 | Tsioutsiouliklis et al. |
| 2009/0077383 | A1 | 3/2009 | de Monseignat et al. |
| 2009/0313502 | A1* | 12/2009 | Jeong et al. ............. 714/18 |
| 2010/0100929 | A1* | 4/2010 | Bae et al. ............... 726/1 |
| 2010/0145771 | A1 | 6/2010 | Fligler et al. |
| 2012/0005753 | A1 | 1/2012 | Provos et al. |
| 2012/0023568 | A1 | 1/2012 | Cha et al. |
| 2012/0054869 | A1 | 3/2012 | Yen et al. |
| 2012/0066203 | A1 | 3/2012 | Robert |
| 2013/0014253 | A1 | 1/2013 | Neou et al. |

OTHER PUBLICATIONS

U.S. Appl. No. 13/938,983, filed Jul. 10, 2013.
Sato, Kazumichi, et al., "Extending Black Domain Name List by Using Co-occurrence Relation between DNS Queries," IEICE Transactions on Communications, Communications Society, vol. E95B, No. 3, Mar. 1, 2012, 8 pages.

(Continued)

*Primary Examiner* — Tu Nguyen
(74) *Attorney, Agent, or Firm* — Vierra Magen Marcus LLP

(57) ABSTRACT

Systems and methods for domain classification using the network request behavior of clients are provided. The network requests of a plurality of clients are analyzed to determine a domain corresponding to each request. This information can be used to associate a set of domains with each individual client. Because of the reciprocal nature of a network request, the information is also used to associate a set of clients with each individual domain. Within the plurality of domains associated with the plurality of clients, there may exist known domains having a classification and unknown domains having no classification. Based on the correlation of clients and domains from their respective associations, the system generates domain classification information for at least one of the unknown domains.

24 Claims, 10 Drawing Sheets

(56) References Cited

OTHER PUBLICATIONS

Enright, Brandon, "Tracking Malicious Activity with Passive DNS Query Monitoring," Cisco Blog, Oct. 17, 2012, Retrieved from the Internet on Jul. 25, 2014: [http://blogs.cisco.com/security/tracking-malicious-activity-with-passive-dns-query-monitoring/], 10 pages.

International Search Report & The Written Opinion of the International Search Authority dated Jun. 24, 2014, International Application No. PCT/US2014/012791.

Wang, Zhiwen et al., "Co-occurrence Relation of DNS Queries Baed Research on Botnet Activities," Journal of Networks, vol. 7, No. 5, May 2012, pp. 856-862.

Lee, Jehyun et al., "Tracking multiple C&C botnets by analyzing DNS traffic," 6th IEEE Workshop on Secure Network Protocols (NPSEC), Oct. 2010, pp. 67-72.

Creighton, T., et al., "DNS Redirect for Protection from Malware," draft-livingood-dns-malwareprotect-02.txt,IETF, Oct. 22, 2010, 22 pages.

* cited by examiner

DOMAIN CLASSIFICATION BASED ON CLIENT REQUEST BEHAVIOR

BACKGROUND OF THE INVENTION

1. Field of the Invention

Embodiments in accordance with the present disclosure relate to computer networks, and particularly to security in computer networks.

2. Description of the Related Art

Network resources such as those available via the Internet are accessed according to Internet Protocol (IP) addresses. IP addresses are represented numerically, traditionally as a quartet of values having the form 111.111.111.111. From the early inception of network computing, familiar alphanumeric name-based addressing has been used to allow users to more easily locate and remember the addresses for resources. For example, domain names are assigned to computing servers and clients. The domain name system facilitates the translation between IP addresses and domain names by maintaining accessible records that associate one or more domain names with one or more IP addresses.

Malware such as computer viruses, Trojan horses, worms, botnets and the like is often distributed over the Internet as or with network resources. Numerous anti-malware products exist that detect, block and/or remove malware from devices. Over time, particular domain names may become associated with the distribution of malware. So-called block lists have been developed that list domains associated with malware. Domains may be identified for placement on a block list in numerous ways. For example, researchers can retrieve network resources and analyze the content of the resource for the presence of malware. Similarly, software can analyze the content of network resources to detect the presence of malware. Once identified, these domain names can be added to a block list and published for use by network devices. A client device or network router may block the transfer of content from a domain on a block list for example.

DETAILED DESCRIPTION

Figure 1:
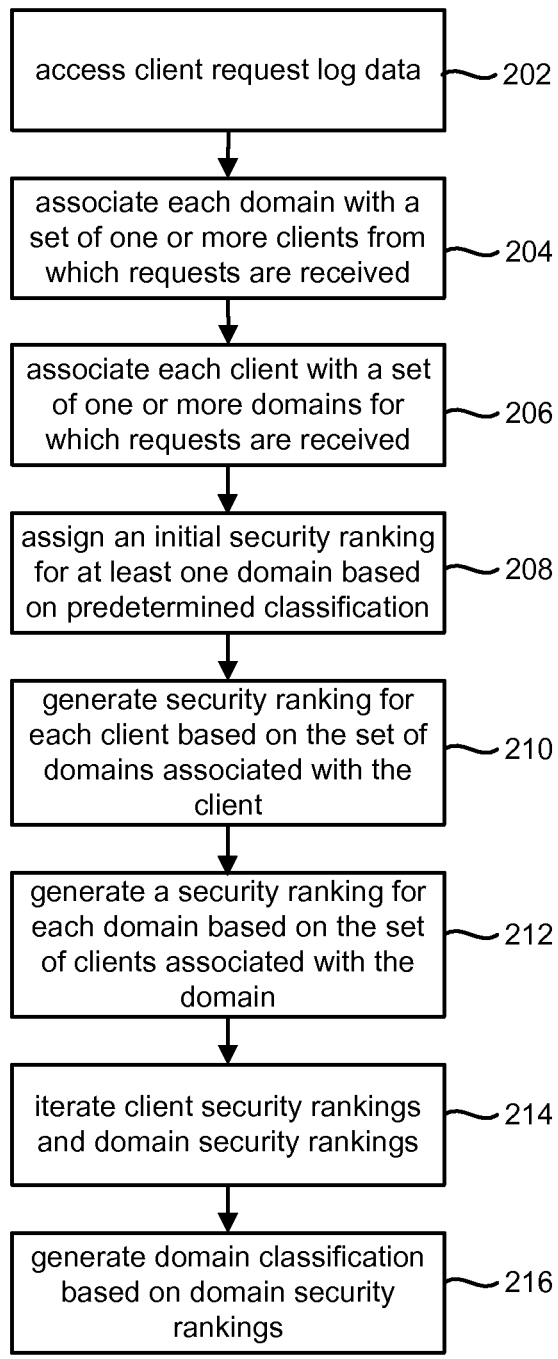
FIG. 1 is a flowchart describing a method of generating classification information based on domain security rankings

Systems and methods for domain classification using the network request behavior of clients are provided. The network requests of a plurality of clients are analyzed to determine a domain corresponding to each request. This information can be used to associate a set of domains with each individual client. Because of the reciprocal nature of a network request, the information is also used to associate a set of clients with each individual domain. Within the plurality of domains associated with the plurality of clients, there may exist known domains having a classification and unknown domains having no classification. Based on the correlation of clients and domains from their respective associations, the system generates domain classification information for at least one of the unknown domains.

Client devices that are infected with malware often send requests to domains that are associated with malware. These domains may be referred to as "bad domains" for convenience, but in general refer to any domain that is associated with malware. The domain may be associated with the distribution of the malware itself, the collection of data from malware at client devices or in any other way affiliated with malicious activity or code. For example, a virus may collect data at a client device and forwarded it to a bad domain for processing. A client device that has been infected with malware may not have malware protection such as anti-malware software and thus, may issue requests to other bad domains. In this manner, these client devices may be regarded as having a "low security reputation" or "ranking" due to their association with bad domains. Conversely, a client device that is not infected with malware is less likely to send requests to domains associated with malware. In this manner, these client devices may be regarded as having a "high security reputation" or "ranking" due to their lack of association with bad domains.

Based on the observation that infected clients are more likely to send requests to bad domains while non-infected clients are less likely to send requests to bad domains, the system can develop security rankings and classifications for unknown domains. Domains that are requested by clean clients more often than infected clients are more likely to be benign. Domains that are requested by infected clients more often than clean clients are more likely to be associated with malware. The system uses the reciprocal nature of the relationship between domains and clients as represented in network request behavior to generate security rankings for domains and/or clients. Starting with a block list of some known bad domains for example, the system may use the network request behavior to correlate security rankings for the clients and ultimately, for unknown domains.

In one embodiment, the system correlates the security reputations of domains and clients to develop domain classifications for unknown domains. For example, the system may examine the network request behavior of clients with respect to unknown domains and domains that are known to be associated with malware, for example due to their presence on a block list. The system develops a security ranking for each client based on its request behavior with respect to the known and unknown domains. Generally, a client that requests a known bad domain has its security ranking lowered. Using the security rankings of the clients, the system can determine security rankings of the unknown domains. For example, a list of clients associated with network requests for a particular domain can be generated. The security ranking of each client on the list can be used to develop a security ranking for the unknown domain. If a domain's security ranking is below a threshold, it can be classified as a domain associated with malware, a so-called bad domain. If the domain's security ranking is above a threshold, it can be classified as a clean or trusted domain. If a domain's security ranking does not exceed any defined threshold, it can remain unclassified or unknown.

FIG. 1 is a flowchart describing a process for generating domain classifications based on client request behavior in accordance with one embodiment of the disclosed technology. While not limited to any particular example, the described process may be implemented using domain name system request information associated with a plurality of clients and a plurality of domains. The process may alternately be implemented using resource-level request information, such as client HTTP requests for resources from target domains. Moreover, the domain classifications may be used in DNS processing or resource-level processing as described more fully hereinafter.

At step 202, client request log data is accessed. The log may include a table of DNS requests in one example. The table may include for each DNS request, the source IP addresses and the target domain name of the DNS request. The log may additionally or alternately include a table of resource-level requests, and again containing source IP address and target domain name information. While not so limited, it is noted that the log data may contain information for many different clients and many different domains. In this manner, the amount of data may better lead to convergence of accurate and stable security rankings as described hereinafter.

At step 204, each domain is associated with a set of one or more clients from which a DNS or resource-level request was received for the domain. Step 204 can include for each domain, creating a list of clients that issued a request for the domain. Similarly at step 206, each client is associated with a set of one or more domains for which the client issued a request. Step 206 can include for each client, creating a list of domains for which a request was issued.

At step 208 an initial security ranking is generated for one or more domains in the set. For example, the system may access block list or other information indicating domains that are associated with malware, viruses, or other malicious content or behavior. These domains can be considered pre-classified as the system already contains some classification information relating to the domains. Any domain associated with one of these lists can be given a low initial security ranking. For example, a system may utilize a security ranking scale of −1000 to +1000 where −1000 represents the lowest security ranking and +1000 represents the highest security ranking. These pre-classified domains may be assigned the lowest initial security rankings of −1000 indicating that they are a known bad domain. Other initial security rankings could also be used based on the specific nature of the rankings associated with the domain. Step 208 may also include assigning an initial security ranking to any unclassified domains. For example, these domains may be assigned an initial security ranking of 0 in the example described above.

Although not show, step 208 may alternately or additionally include generating an initial security ranking for one or more clients in the set. For example, the system may access information indicating that certain clients are known or suspected to be infected with malware. Information indicating the client devices of researchers that are actively engaging bad domains may be accessed as well. Step 208 may also include assigning an initial security ranking to all unknown clients.

At step 210, a security ranking for each client is generated based on the set of domains associated with the client. The security ranking for each client may be calculated in various ways, but is based on the security ranking or reputation of the domains for which the client has issued requests. For example, one embodiment may aggregate the security ranking of each domain associated with a client to determine the client's security ranking. Aggregating the security ranking of each domain can include adding the security rankings and optionally applying weightings to the domains, etc. Step 210 can include replacing the initial security ranking assigned to any clients in step 208.

At step 212, a security ranking for each domain is generated based on the set of clients associated with the domain. The security ranking for each domain may be calculated in various ways, but is based on the security ranking or reputation of the clients that issue requests for that domain. For example, a model may aggregate the security ranking of each client associated with a domain to determine the domain's security ranking. Aggregating the security ranking of each client can include adding the security rankings and optionally applying weightings to each client, etc. Step 212 can include replacing the initial security ranking assigned to any domains in step 208.

At step 214, the calculations of the client security rankings and domain security rankings at steps 210 and 212 are iterated. The security rankings of the domains and clients are correlated so that the rankings can be defined reciprocally. In this manner, their values may be calculated iteratively. This permits the propagation of initial security information relating to clients or domains. As described, the client security ranking is generated based on its associated domain security rankings and the domain security ranking is generated based on its associated client security rankings. Accordingly, step 214 may include regenerating the client security rankings based on the domain security rankings from the previous iteration of step 212 and regenerating the domain security rankings based on the client security rankings from the previous iteration of step 210. The number of iterations of step 214 may vary by embodiment and indeed, is not required and may be skipped. In one example, the iteration proceeds until all or a predetermined number of the client and domain security rankings converge to values that do not vary by more than a threshold amount by iteration.

At step 216, the security rank engine generates a domain classification for any unknown or not classified domains based on the security ranking for the domain. Various thresholds or other techniques may be used at step 216. For example, a low security threshold may be established and a high security threshold may be established. If a domain has a security ranking below the low security threshold it may be added to a block list or otherwise denoted as being suspicious or associated with malware. If a domain has a security raking above the high security threshold, it may be white listed or otherwise denoted as being safe and not associated with malware. If a domain has a security ranking between the thresholds it may remain unclassified. Other examples may include providing various levels of domain classifications based on the actual security ranking value. This technique may provide additional information as to the level of security threat a particular domain may pose. As will be described hereinafter, the domain classifications can be used to route DNS requests or resource level requests.

Figure 2:
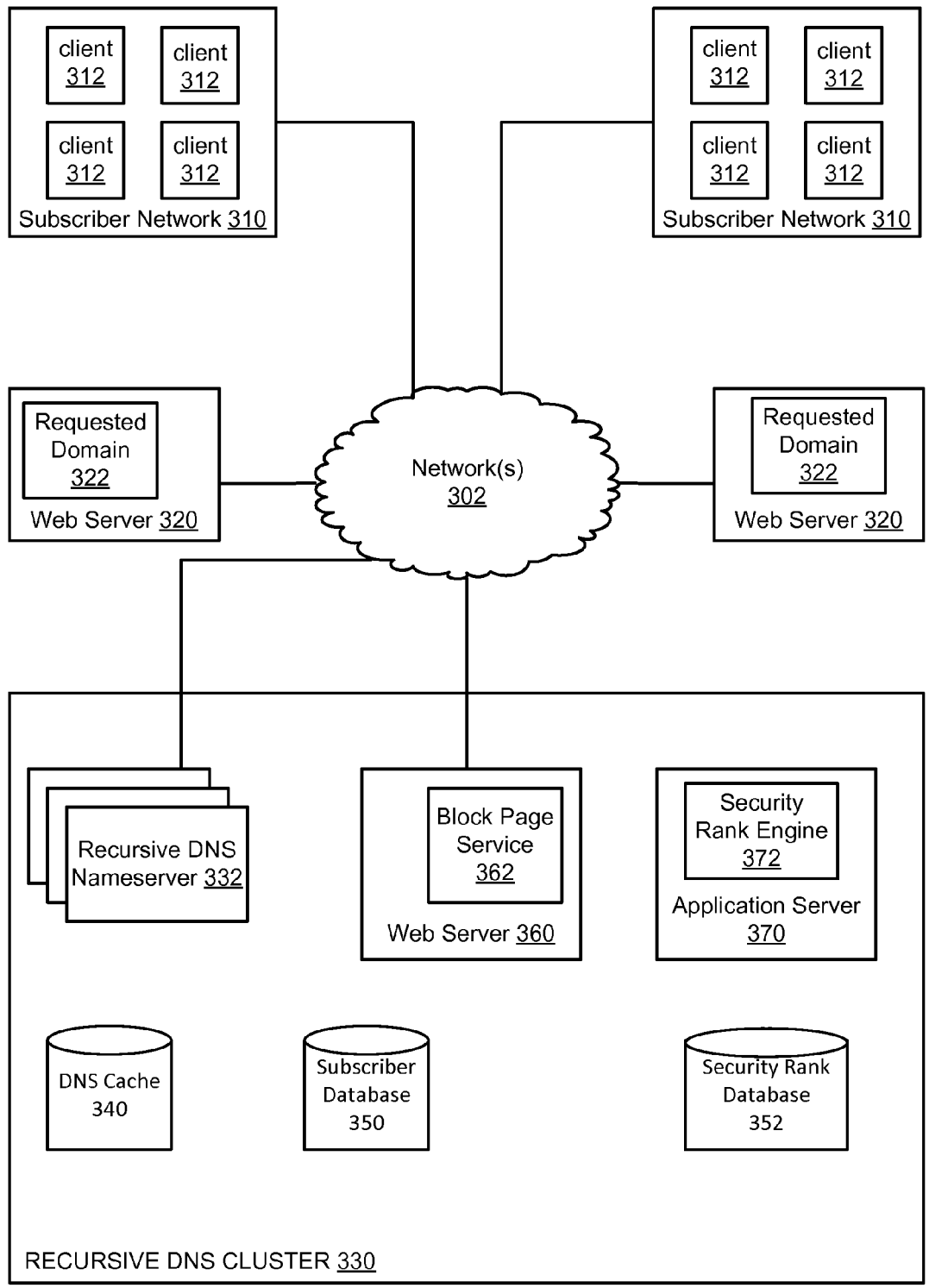
FIG. 2 is a block diagram of a computer network describing the generation and use of domain security rankings based on network request behavior in accordance with one embodiment.

FIG. 2 is a block diagram of a system depicting an example of an implementation of the disclosed technology for domain classification that is used in processing DNS requests and/or resource level requests. Subscriber networks 310, web servers 320 and a recursive DNS cluster 330 are each in communication with one or more network(s) 302.

Network(s) 302 and 310 can include any combination of local area networks, wide area networks (WAN), the Internet, and/or any other network. The recursive DNS clusters can vary by implementation and include any suitable computing system such as a server, group, grid, or distributed platform of computer systems configured to respond to requests for domain name information. While the cluster in FIG. 2 is depicted with multiple recursive DNS nameservers, other embodiments may include a single computing system within a cluster such as a single server. The individual recursive nameservers in a cluster can be formed of hardware and/or software configured as described for domain name resolution. By way of non-limiting example, the various nameservers can include personal computers, servers, workstations, mainframes, etc.

Each of the recursive DNS nameservers in a cluster resolves requests for domain name information from other computing devices such as clients 312. Although two subscriber networks 310 with four clients 312 are shown, any number of subscriber networks or clients may be used. For example, a subscriber network may include a single client 312.

The nameservers 332 in cluster 330 include or are in communication with a local DNS cache 340 and subscriber database 350. While a single cluster is shown in FIG. 2, embodiments may include multiple clusters at various locations that share DNS, subscriber, and security ranking information as described. The domain name information stored in the cache can be any type of information associated with a domain name. Some examples of domain name information are resource records, such as "A" records used for storing a 32-bit IP address associated with a domain name, "AAAA" records used for storing an IPv6 128-bit address associated with a domain name, and "CNAME" or canonical name records for a DNS alias. A request for domain name information can include a packet, cell, message, or signal used to ask for domain name information.

The DNS cache 340 at each cluster facilitates more efficient responses to DNS requests by storing domain name information such as DNS records corresponding to previously received DNS requests. The cache may also store other domain name information, such as pre-fetched domain name information. If the cache contains the DNS record(s) needed to respond to a DNS request, the DNS nameserver can return the cached information without contacting other nameservers to fulfill the request. When DNS requests from client 312 or other computing devices cannot be fulfilled with cached domain name information, the recursive DNS cluster initiates recursive processing to determine the needed information. For example, a DNS nameserver 332 may first issue a DNS request to one of the root servers for generic top level domain information, followed by one or more DNS requests to various authoritative name servers to determine the requested domain name information.

A response can also include a packet, cell, message, or signal used for transmitting domain name information. A Uniform Resource Locator (URL) identifies resources available through network hosts. Some examples of URLs are http—HTTP resources, https—HTTP over SSL, ftp—File Transfer Protocol, mailto—E-mail address, ldap—Lightweight Directory Access Protocol lookups, file—resources available on the local computer or over a local file sharing network, news—Usenet newsgroups, gopher—the Gopher protocol, telnet—the TELNET protocol, and data—the Data: URL scheme for inserting small pieces of content in place. Typically, a URL includes domain names that form a portion of the URL.

In response to a DNS request for domain name information associated with a domain name, a recursive DNS nameserver within a cluster can determine a client identifier. A client identifier discriminates the sender, owner, user, or subscribing entity associated with the request for domain name information. Some examples of a client identifier are IP addresses, userid's, and secure tokens. If an IP address identifier is used, the recursive DNS nameserver can inspect the network packet containing the request to determine the source IP address of the packet. A username or secure token may be included in the request for domain information from which the recursive DNS nameserver determines the client identifier and the client information. In one example, a device or application on a subscriber's network is setup to modify DNS requests to include such identifiers.

In one example, the client identifier is a subscriber identifier and the client information is subscriber information. The client identifier can identify the entire subscriber network or an individual client within a subscriber network. A subscriber is generally an individual and/or entity that agrees to service conditions of an operator of a recursive DNS cluster 330. Subscribers may range from entities operating large networks 310, such as those provided by a wireless service providers or large corporations, to individuals having a home internet connection. It is noted that while subscriber networks 310 are depicted with multiple clients 312, that is not required. In a simple example, the subscriber may operate a single personal computer as a client with an internet connection.

The recursive DNS nameserver resolves a particular request for domain name information based on the subscriber information to generate a response. The recursive DNS nameserver returns the response to the client or a user associated with a client, providing the resolved domain name information in accordance with the subscriber information. By way of example, a substitute network (e.g., IP) address that satisfies a substitution criterion for the domain name in the request for domain name information may be obtained. The network and user records may specify one or more DNS resolution options, filters, features or other techniques for determining what IP address to resolve for a given domain name. For example, in providing DNS services to the DNS client, the DNS servers may provide resolved domain name information or redirect the DNS client to another location based on subscriber information stored at the DNS servers that indicates how an end user wants the DNS servers to employ the DNS resolutions options or features. In various examples, the DNS cluster may provide various DNS resolution options or features, such as misspelling redirection, parental filters, domain blocking, or phishing protection through the DNS process.

In some embodiments, a user or subscriber of a service provided by the DNS cluster may set one or more preferences or selections for how the options are to be enabled or otherwise applied when a DNS nameserver 332 resolves DNS queries associated with the user. Preferences or settings for a user or subscriber may be stored as subscriber information at subscriber database 350 or in one or more storage devices accessible to the DNS cluster 330. Upon identifying the user, subscriber information associated with the user may be used to alter the IP address in a DNS response that the user receives. For example, a user or subscriber may establish subscriber information that instructs the DNS nameserver to alter responses to DNS requests that are associated with malware, adult web sites, potential phishing or pharming sites, and other sites deemed inappropriate by the user or to which the user wishes to block or filter access, etc. In FIG. 2, the web server and nameserver utilize a single database but individual databases containing the same information may be used in other embodiments.

Network records may be included in subscriber database 350 that specify preferences or selections for resolving domain name queries associated with a particular subscriber's network 310. A subscriber may set permissions and preferences in network records to indicate that certain preferences can be bypassed by particular users of the subscriber's network. For example, an administrator for a corporate network 310 may set up network records to allow certain users of network 310 to bypass particular preferences in the network records, such as those blocking access to certain domains. Alternatively or additionally, permissions and preferences for overriding network preferences may be included in user records. User records can include subscriber information for individual users or entities using the services of DNS cluster 330. An individual user may specify resolution preferences or selections that will apply to individual DNS requests issued by the user. DNS nameserver 332 can use a subscriber identifier such as a userid, token or other identifier to determine a corresponding user record for a particular request. The user records and/or network records may be used by a block page service 362 in processing user resource requests. User records and network records may be used together to determine a set of permissions or preferences for applying to any individual request for domain name information, or requests for actual resources as will be explained hereinafter. For example, a user may set a preference in a user record allowing access to a certain category of domains, while a network record may indicate that users are not allowed to override the network preference set by the subscriber. In this manner, the nameservers 332 and/or block page service 362 operating as set forth below may use both types of records in responding to a resource request or DNS request. This permits a user to define a set of user preferences that can be applied when using different subscriber networks 310.

The domain name records in cache 340 may be associated with or have therein one or more flags. A flag can be any indicator, marking, or symbol associated with a domain name. For example a binary indicator stored in the domain name record can be used. A flag may be used to identify any type of information for a particular domain. For example, a flag may be used to mark a domain name as suspicious or untrustworthy, such as a site associated with malware or engaged in pharming or phishing activities. A flag may also indicate that a domain hosts illegal material, hate speech, pornography, material related to drugs or alcohol, or otherwise objectionable material that a subscriber does not wish to access or permit access to. Any number of flags can be used to create any number of categorizations for domain names. For example, flags denoting various levels of adult material may be used to classify domain according to their age-appropriateness. Different levels of security risks may be denoted by flags. Flags can also be set in domain name records to cause requests for a particular domain to be proxied. This can allow a subscriber to have traffic for certain domain names proxied, for example for logging, auditing and the like, while traffic for all other domains is not proxied.

When a request for domain name information is received, the DNS nameserver 332 resolves the domain name query using the subscriber information and any flags in the domain name record. For example, a network record for a DNS request may set a preference that a particular category of domains or a particular domain is to be blocked from access by devices on the network. If a DNS request is for a domain having a flag matching such a preference in the network record, the DNS nameserver may generate a DNS response with a substitute IP address that directs the client device to an alternate domain. In one example, the DNS nameserver provides the client device with domain name information associated with block page service 362 on web server 360. In response to the client device's resource request, the block page service can provide a block or landing page to the client device, for example, informing the user that the requested domain is not accessible on their network. The block or landing page refers generally to any resource or information provided by the block page service in response to a request for a target domain that is not an actual resource provided by the target domain.

A security rank engine 372 is configured on an application server 370 that generates security rankings for clients 312 and domains 322 to facilitate domain classification. The security rank engine may additionally generate flags or other domain identifying information based on the security rankings. The security rankings and optionally the domain classifications are maintained in security rank database 352. The domain classifications can be used to generate flags associated with the domain name records in DNS cache 340 in one example. In this manner, the DNS nameserver 332 can respond to client DNS requests using domain classifications generated by the security rank engine. For example, the security rank engine may generate domain security rankings for database 352. Using the security rankings, particular domains may be determined to be associated with malware. The security rank engine or other component can update DNS cache or other information with a flag indicating that the domain is associated with malware. DNS or resource-level requests can be processed using the flags and subscriber information to generate DNS information or resources for the domain. This may include providing a block or landing page or DNS information for such a page in response to a client request.

Subscriber database 350 includes a log reflecting client DNS request behavior. The log includes a record of each DNS request received by a nameserver 332 from a client 312. The log can include a client identifier such as the source IP address of each request and a domain identifier such as the target domain or host name of the request.

Security rank engine 372 generates security rankings and domain classifications using the log of client DNS requests from subscriber database 350 in one embodiment. The security rank engine correlates the request behavior of each client to generate a security ranking for unknown domains having no classification. The request behavior can also be used to generate or update a security ranking for domains having an existing classification. For example, the DNS cluster may process DNS requests from a plurality of clients for a set of domains including known domains having a classification and unknown domains having no classification. The classification of known domains may be used to generate security rankings for the plurality of clients. Based on the request behavior of a subset of clients associated with an unknown domain, a security ranking for the unknown domain can be generated. The security rank engine may optionally classify the unknown domain based on the security ranking. The security ranking and/or classification can be used to generate one or more flags for a corresponding domain name record in the DNS cache 340 in one example.

The security rank engine may alternately or additionally generate security rankings and domain classifications using a log of client request behavior associated with block page service 362. This log can be maintained in subscriber database and also sets forth a correlation between domain and clients. Although principally described as responding to redirections from nameserver 332 away from blocked domains, etc., the block page service 362 can also operate independently of any domain name system services provided by the cluster. In one embodiment, for example, client requests for domains 322 may simply be proxied by the block page service. The information can be tracked similarly to the DNS information to generate security rankings and domain classifications.

Figure 3:
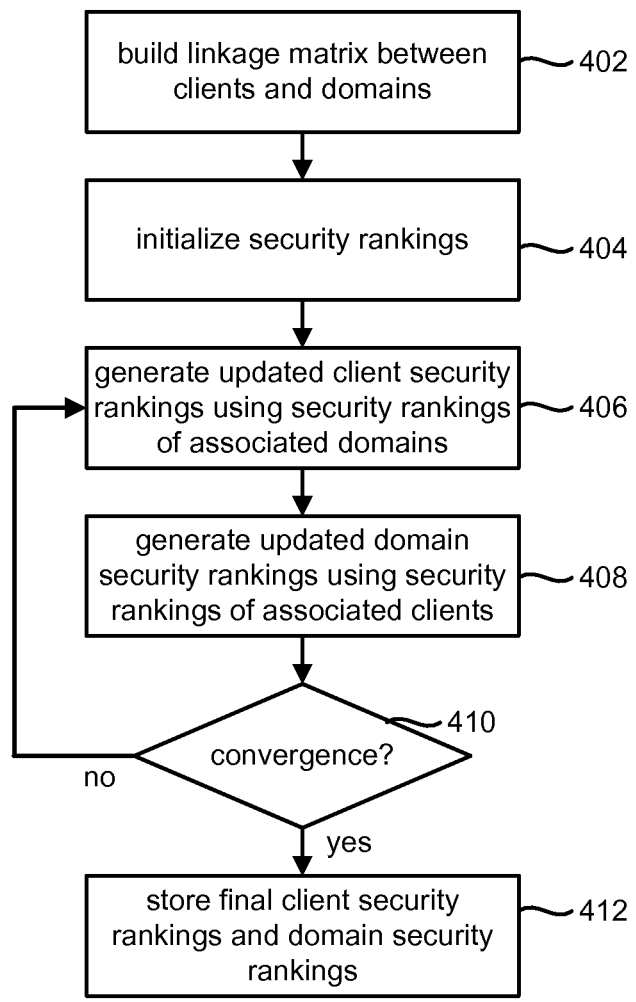
FIG. 3 is a flowchart describing a method of generating client and domain security rankings in accordance with one embodiment.

FIG. 3 is a flowchart describing a process for generating client security rankings and domain security rankings as can be performed by security rank engine 350 in one embodiment. FIG. 3 may be performed as part of steps 210 of and 212 of FIG. 1 to generate client and domain security rankings.

At step 402, the security rank engine generates a linkage matrix between the clients and the domains. The linkage matrix is created based on the log of client DNS requests in one example. In another example, the linkage matrix is created based on a log of client resource-level requests (e.g., HTTP requests). The log may include a table, database or other storage mechanism with entries listing a source IP address or other client identifier of the client issuing a request and a target domain for the client's request. Step 402 may include an input query to this log as set forth in Equation 1 in one example to generate an output as set forth in Equations 2 and 3.

querylog(each entry: client to domain)    Equation 1

DID->CID CID CID CID    Equation 2

CID->DID DID DID DID    Equation 3

Each entry in the log includes a client identifier and a domain identifier for a DNS request or resource request that was received at DNS cluster 330. The client identifier CID identifies the source of the request, for example the source IP address. The domain identifier DID identifies the target of the request, for example the target domain name. In another example, the log may include a single client identifier and all domains associated with the identifier's request. The output of the query includes for each domain identifier, a list of client identifiers for all clients that have issued a request for the domain as set forth in Equation 2. The output of the query includes for each client identifier, a list of domain identifiers for all domains domain for which the client has issued a request as set forth in Equation 3. In another example, the log may include hostname identifiers. The security rank engine can convert the hostname to a domain name in generating the outputs.

At step 404, the security rank engine initializes the security rankings. In one embodiment, step 404 includes setting all client security rankings to a starting value (e.g., 0 in a scale of −10 to 10). Step 404 can also include setting all domain security rankings to a starting value. Step 404 may also include providing an initial security ranking for one or more domains based on an existing or predetermined classification. For example, domains on a block list associated with malware may be given a starting value equal to the lowest security ranking. Other starting values that do not indicate the lowest security ranking could also be used. Step 404 may further include providing an initial security ranking for domains on a white list or that are otherwise known not to be associated with malware. The security ranking for these domains may be set to indicate a highest security ranking, although other starting values could be used.

At step 406, the security rank engine generates updated client security rankings using the security ranking of each domain associated with the client.

Equation 4 is a recursive definition that can be applied to generate a client security ranking in one embodiment:

$$r(c)\_t+1 = \Sigma(r(d)\_t/L(d)) \qquad \text{Equation 4}$$

A client c has a security ranking $r(c)\_t+1$ as set forth in Equation 4 for all domains d for which the client issues a request. In equation 4, the security ranking for a particular domain d at time t is set forth as $r(d)\_t$ and the total number of clients issuing a request for the domain is set forth as $L(d)$. Thus, for each client the security ranking of each domain it is associated with is determined and then divided by the total number of clients the domain is associated with to yield a marginal security rating for the client. The final security ranking for the client is equal to the sum of the marginal security ratings of each domain associated with the client.

At step 408, the security rank engine generates updated domain security rankings using the security ranking of each client associated with the domain.

Equation 5 is a recursive definition that can be applied to generate a domain security ranking in one embodiment:

$$r(d)\_t+1 = \Sigma(r(c)\_t/L(c)) \qquad \text{Equation 5}$$

A domain d has a security ranking $r(d)\_t+1$ as set forth in Equation 5 for all clients c that issue requests for the domain. In equation 5, the security ranking for a particular client at time t is set forth as $r(c)\_t$ and the total number of domains for which the client issues requests is set forth as $L(c)$. Thus, for each domain the security ranking of each client that is associated with the domain is determined and then divided by the total number of domains the client is associated with to yield a marginal security rating. The denominator provides the marginal as the sum of the counts of the conditioning variable co-occurring with anything else. The final security ranking for the domain is equal to the sum of the marginal security ratings of each client associated with the domain.

Steps 406 and 408 can be performed in any order and apply the recursive definitions to calculate the security rankings based on the reciprocal nature of the client domain connections. Reciprocal connections are defined between the clients and domains so that the security rankings of the two are correlated. A first iteration of steps 406 to 408 updates the initial security rankings of each client and domain established at step 404 using these definitions. In this manner, a client or domain security ranking at time t+1 is based on the security rankings of each associated client or domain at time t.

At step 410, the security rank engine tests for convergence of the security ranking values for the clients and domains. For example, the system may determine whether the change in each security ranking value from the previous iteration is within a threshold. Once the changes in value are within the threshold, convergence can be determined. If the values have not converged, the process loops back to step 406. The client security rankings are updated using the values of the domain security rankings from the previous iteration and the domain security rankings are updated using the values of the client security rankings from the previous iteration. Once the system determines that the domain and client security rankings have reached convergence, the final values are stored at step 412.

Figure 4:
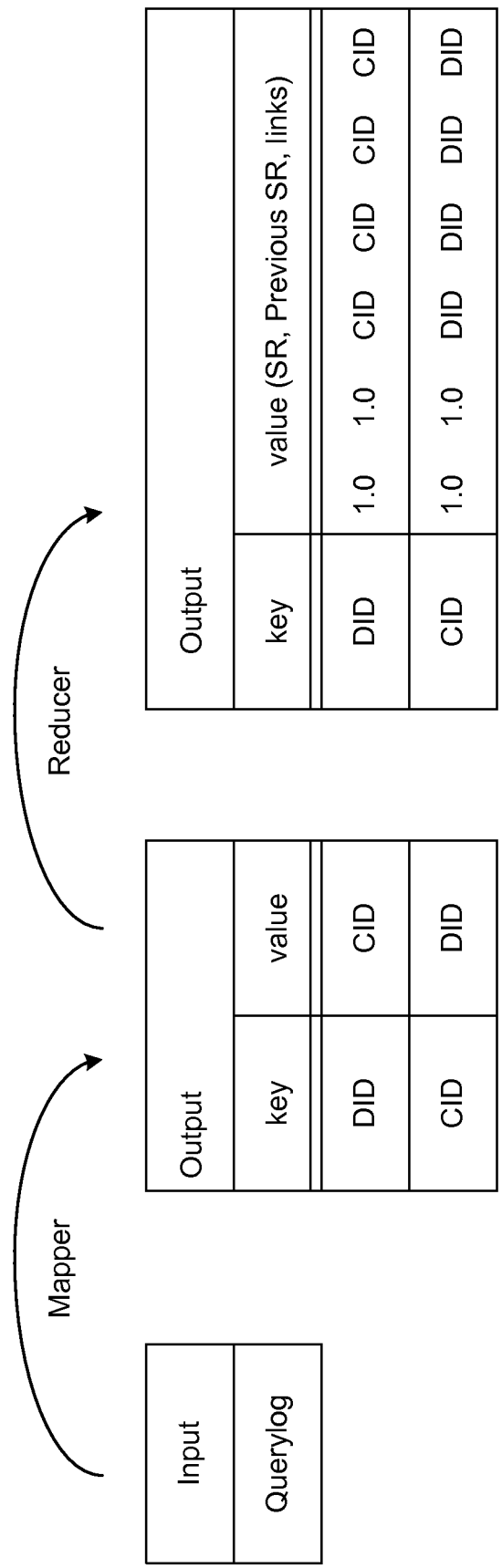
FIG. 4 is a block diagram illustrating the creation of client and domain linkages in accordance with one embodiment.
Figure 5:
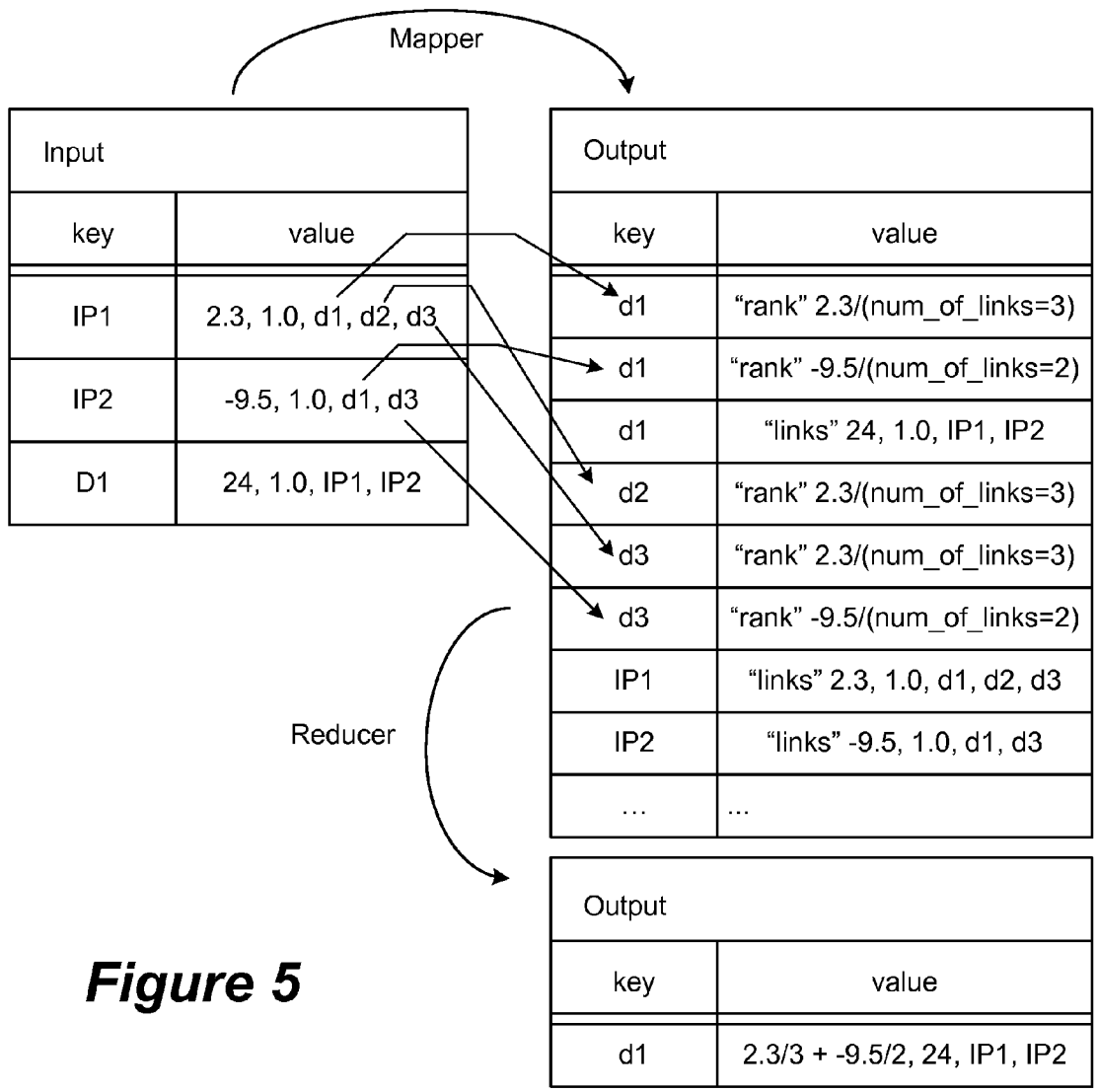
FIG. 5 is a block diagram illustrating the generation of domain security rankings and client security rankings based on client and domain linkages.

FIGS. 4 and 5 are block diagrams describing a specific example for generating client and domain security rankings based on client request behavior. FIG. 4 depicts map and reduction processing that can be used to build a linkage matrix between clients and domains as described at step 402 of FIG. 3 and to initialize security rankings as described at step 404 in one embodiment. A map job is first defined that generates a key value pair for each domain and client association. Equation 6 sets forth an example of a map job to generate domain to client key value pairs and Equation 7 sets forth an example to generate client to domain key value pairs for each entry in the log.

$$\text{emit}[\text{key}(DID), \text{value}(CID)] \quad \text{Equation 6}$$

$$\text{emit}[\text{key}(CID), \text{value}(DID)] \quad \text{Equation 7}$$

The input of the map job is a query to the log of client requests for domains. The log can include a table of each client DNS request listing the client identifier of the request and the target domain of the request. The output of the map job is a key value pair listing each client to domain and domain to client mapping. Where the key is a domain identifier, the value is the client identifier of the request. Where the key is a client identifier, the value if the domain identifier of the request.

A reduce job is defined with outputs having domain to client and client to domain key value pairs as set forth in Equations 8 and 9.

$$\text{emit}[\text{key}(DID), \text{value}(CID\ CID\ CID)] \quad \text{Equation 8}$$

$$\text{emit}[\text{key}(CID), \text{value}(DID\ DID\ DID)] \quad \text{Equation 9}$$

Equation 8 generates a key value pair, where the key is a domain identifier DID and the value is a list or sequence of client identifiers CID for every client that has issued a request for the domain. Equation 9 generates a key value pair where the key is a client identifier CID and the value is a list or sequence of domain identifiers DID for every domain for which the client has issued a request.

In FIG. 4, the output of the reduce job also includes the current security ranking and previous security ranking for each client and each domain. The security rankings are each set to 1.0 in this example as initial values before any iteration based on client request behavior.

FIG. 5 depicts map and reduction processing that can be used to generate updated client security rankings and domain security rankings when iterating at steps 406 and 408 of FIG. 3. A map job is first defined with an input including a key value pair for each domain as set forth in Equation 10 and for each client as set forth in Equation 11.

$$\text{Key}(DID), \text{value}(SR\ CID\ CID\ CID) \quad \text{Equation 10}$$

$$\text{Key}(CID), \text{value}(SR\ DID\ DID\ DID) \quad \text{Equation 11}$$

Where the key is a domain identifier DID, the value is the security ranking SR of the domain and a list of client identifiers associated with the domain. Where the key is a client identifier CID, the value is the security ranking SR of the client and a list of domain identifiers associated with the client.

The output of the map job is a key value pair as set forth in Equation 12.

$$\text{key}(CID\ \text{or}\ DID), \text{value}(x=SR/\text{linklist.size}(\ )) \quad \text{Equation 12.}$$

When the key is a client identifier CID, the value is equal to x, where x is equal to the security ranking SR of the client divided by the number of domains associated with the client. For example, if a client issues DNS requests for three domains, the linklist.size( ) is equal to three. When the key is a domain identifier, DID, the value is again equal to x, where x is equal to the security SR of the domain divided by the number of clients associated with the domain. For example, if three clients issue DNS requests for the domain, the linklist.size( ) is equal to three.

A reduce job is defined with a first input including a key value pair for each domain and for each client as set forth in Equation 13. For either a client identifier CID key or domain identifier DID key, the value is the value of x defined in the corresponding map job (x=SR/linklist.size( )).

$$\text{Key}(DID/CID), \text{value}(x) \quad \text{Equation 13}$$

A second input includes a key value pair for each domain identifier as set forth in Equation 14. For a domain identifier DID, the value includes the value of x and a list of client identifiers CID associated with the domain.

$$\text{Key}(DID), \text{value}(x\ CID\ CID\ CID) \quad \text{Equation 14}$$

The second input includes a key value pair for each client as set forth in Equation 15. For a client identifier CID, the values includes the value of x and a list of domains associated with the client.

$$\text{Key}(CID), \text{value}(x\ DID\ DID\ DID) \quad \text{Equation 15}$$

FIG. 5 provides a specific example of map and reduce processing to generate updated client and domain security rankings. The map job input includes four key values Including a first client identifier IP1, a second client identifier IP2 and a first domain identifier d1. For client identifier IP1, the current security ranking is 2.3, the previous security ranking is 1.0 and the list of associated domains includes domains d1, d2 and d3. For client identifier IP2, the current security ranking is −9.5, the previous security ranking was 1.0 and the associated domains are d1 and d3. For domain identifier d1, the current security ranking is 24, the previous security ranking is 1.0 and the associated clients are IP1 and IP2.

The output of the map job includes s a key value pair for each domain request. For domain d1, two pairs are generated. The first pair includes key d1 and a value corresponding to client identifier IP1. The value is equal to x, where x is equal to the security ranking of IP1 divided by the total number of domains associated with IP1. In this case, the value is equal to the current security ranking of IP1 (2.3) divided by the number of domains associated with client IP1 (3). The second pair also includes key d1 and a value corresponding to client identifier IP2. The value is equal to the current security ranking of IP2 (−9.5) divided by the number of domains associated with client IP2. A third key value pair is created for domain d1 that replicates that input to the map job. These rows, marked "links" track the neighboring links in one embodiment as part of the process for updating the security rankings. Additional key value pairs are created for the single request associated with domain d2 and the two requests associated with domain d3. Finally, key value pairs are created for the two client identifiers based on their associated domains The reduce job is defined with an output as set forth in Equation 16 for each domain identifier and an output as set forth in Equation 17 for each client identifier.

$$\text{Key}(DID), \text{value}(\Sigma x\ CID\ CID\ CID) \quad \text{Equation 16}$$

$$\text{Key}(CID), \text{value}(\Sigma x\ DID\ DID\ DID) \quad \text{Equation 17}$$

For a domain identifier DID, the value includes a summation $\Sigma x$. The summation $\Sigma x$ is a summation based on the security rankings of each associated client. The security ranking of each client is divided by the number of domains requested by the client. These divided security rankings are then added together for the domain security ranking. The value also includes a list of client identifiers for each associated client.

For a client identifier CID, the value includes a summation $\Sigma x$. The summation $\Sigma x$ is a summation based on the security rankings of each associated domain. The security ranking of each domain is divided by the number of clients requesting the domain. These divided security rankings are then added together for the client security ranking. The value also includes a list of domain identifiers for each associated domain.

The reduce job in FIG. 5 illustrates the generation of the updated security ranking for domain d1 and the corresponding output that is created. The output of the reduce job includes a key for domain d1. The value is equal to the summation of x for domain d1. As set forth in Equation 16, the security ranking for domain d1 is equal to the value of x for each client IP1 and IP2 that have requested domain d1. The value of the reduce output also includes the previous security ranking 24 for d1 and a list of the clients IP1 and IP2 that are associated with domain d1.

Figure 6:
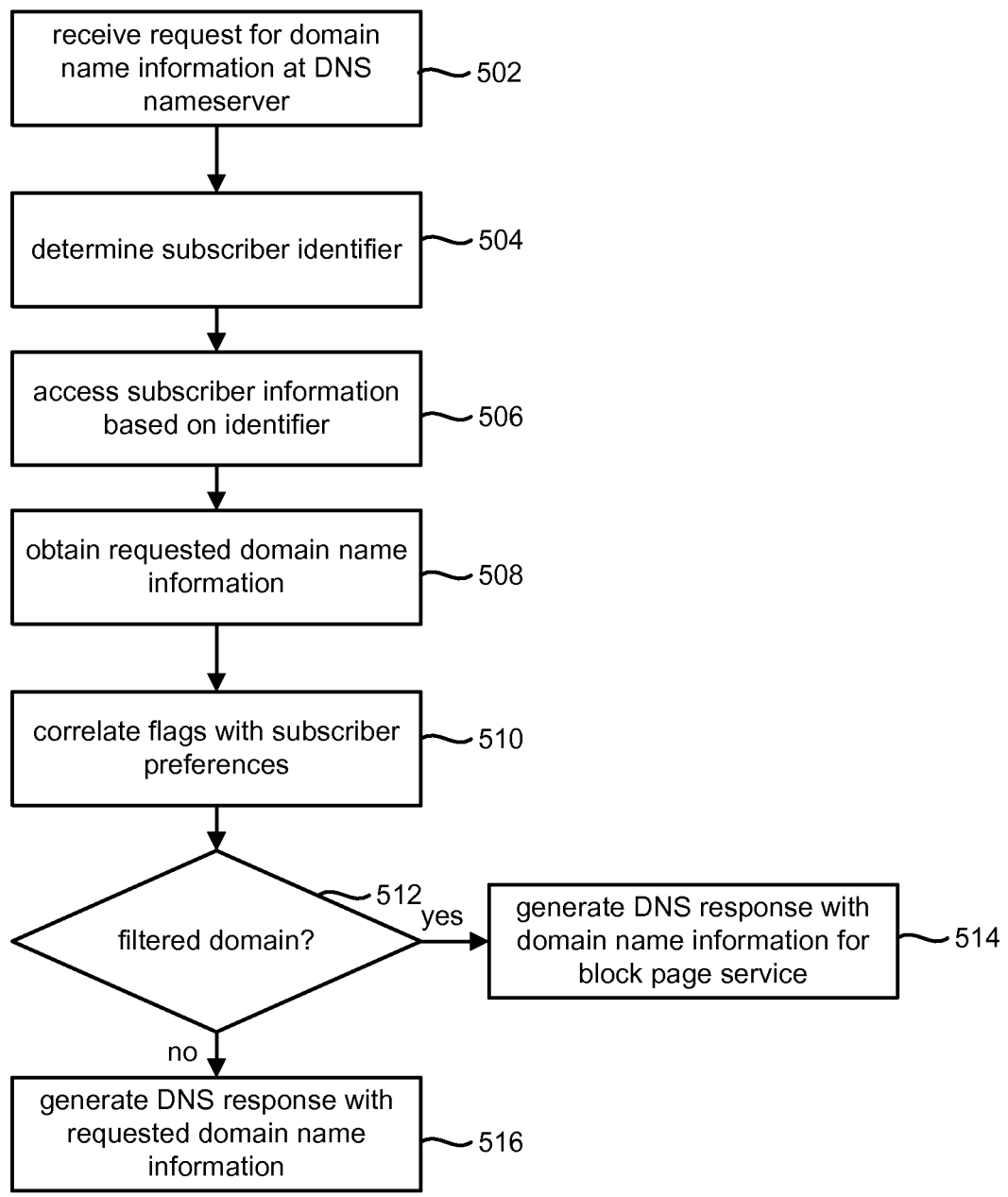
FIG. 6 is a flowchart describing a method of processing a DNS request based on domain security rankings in accordance with one embodiment.
Figure 7:
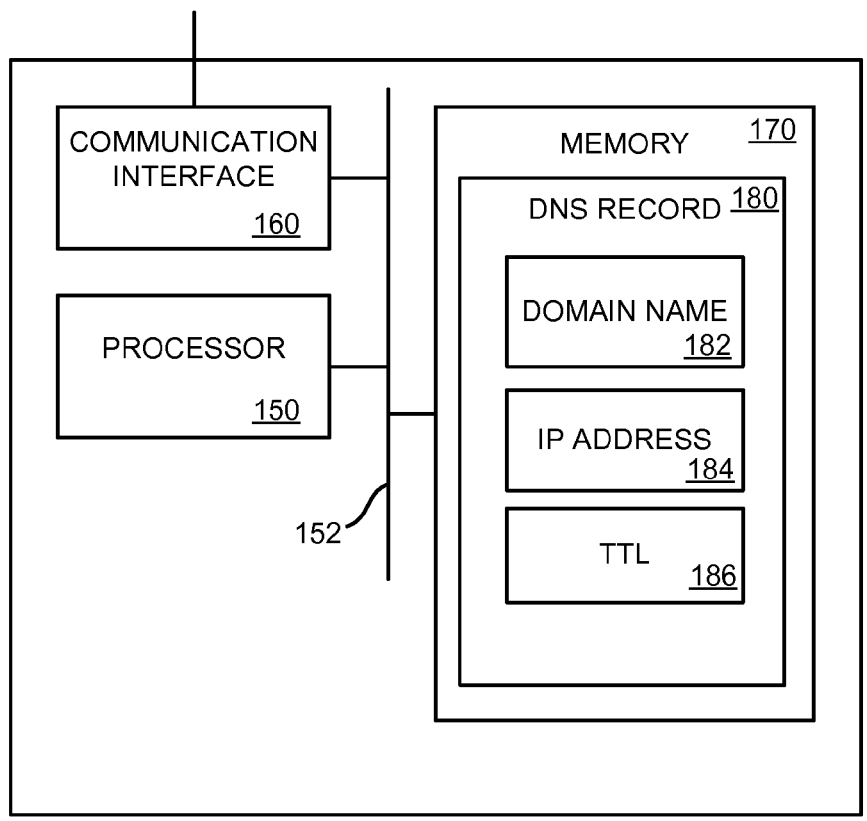
FIG. 7 is a simplified block diagram of an example of an authoritative DNS name server.

FIG. 6 is a flowchart describing a method of processing domain name requests by a recursive DNS cluster in accordance with one embodiment. In one embodiment, FIG. 6 includes using the domain classifications generated at step 216 of FIG. 1. At step 502, a DNS nameserver 332 receives a request for domain name information from a client device 312. In this example, it is assumed that the client device 312 is part of a subscriber network, and thus, that a unique IP address distinguishing the client device from another client device cannot be obtained. At step 504, the DNS nameserver determines a subscriber identifier associated with the DNS request. In one example, the DNS nameserver parses the DNS request for the source IP address which is used as the subscriber identifier. At step 506, the DNS nameserver uses the subscriber identifier to obtain a corresponding network record from database 350. At step 508, the DNS nameserver obtains the requested domain name information. Step 508 may include determining the domain in the request for domain name information and checking cache 340 for a domain name record corresponding to the requested domain. If the cache contains a domain name record for the requested domain and the record is not expired, the DNS nameserver obtains the cached domain name record. If the cache does not contain a domain name record for the requested domain or if the domain name record is expired, the DNS nameserver attempts to retrieve the domain name information using one or more authoritative and/or root DNS nameservers.

After obtaining the domain name information, the DNS nameserver determines whether there are any flags associated with the requested domain and if so, correlates the flags with the preferences in the network record 352 at step 510. Step 510 can include determining if the domain information includes a flag indicating that a domain is associated with malware as determined by security rank engine 372 in one embodiment. Step 510 includes determining whether the domain name information for the requested domain includes any identifiers corresponding to preferences in the subscriber information. For example, step 510 may include determining an age-rating for the domain and comparing that with an age-rating preference in the subscriber information record. Step 510 may also apply system wide preferences, for example for block listed domains or domains otherwise associated with malware. In this instance, the system will generate a response for the block page service in response to all requests for such a domain. In other examples, a subscriber may choose to override or otherwise not have these system wide preferences applied.

If any of the flags correlate to preferences in the network record, the DNS nameserver determines if any of the flags and corresponding network preferences indicate that the traffic to the domain should be filtered at step 512. In one embodiment, step 512 includes determining whether the network records indicate that the requested domain should be blocked for requests from the subscriber's network. Step 512 may also include determining whether the records indicate that traffic for the requested domain should be proxied, but access still allowed.

If the domain name information contains a flag indicating that the requested domain should be proxied or blocked, the DNS nameserver issues a DNS response at step 514 with domain name information for the block page service 336 at web server 334. If the domain is not to be blocked or proxied for the subscriber's network, the DNS nameserver issues a DNS response at step 516 with domain name information for the requested domain.

Figure 8:
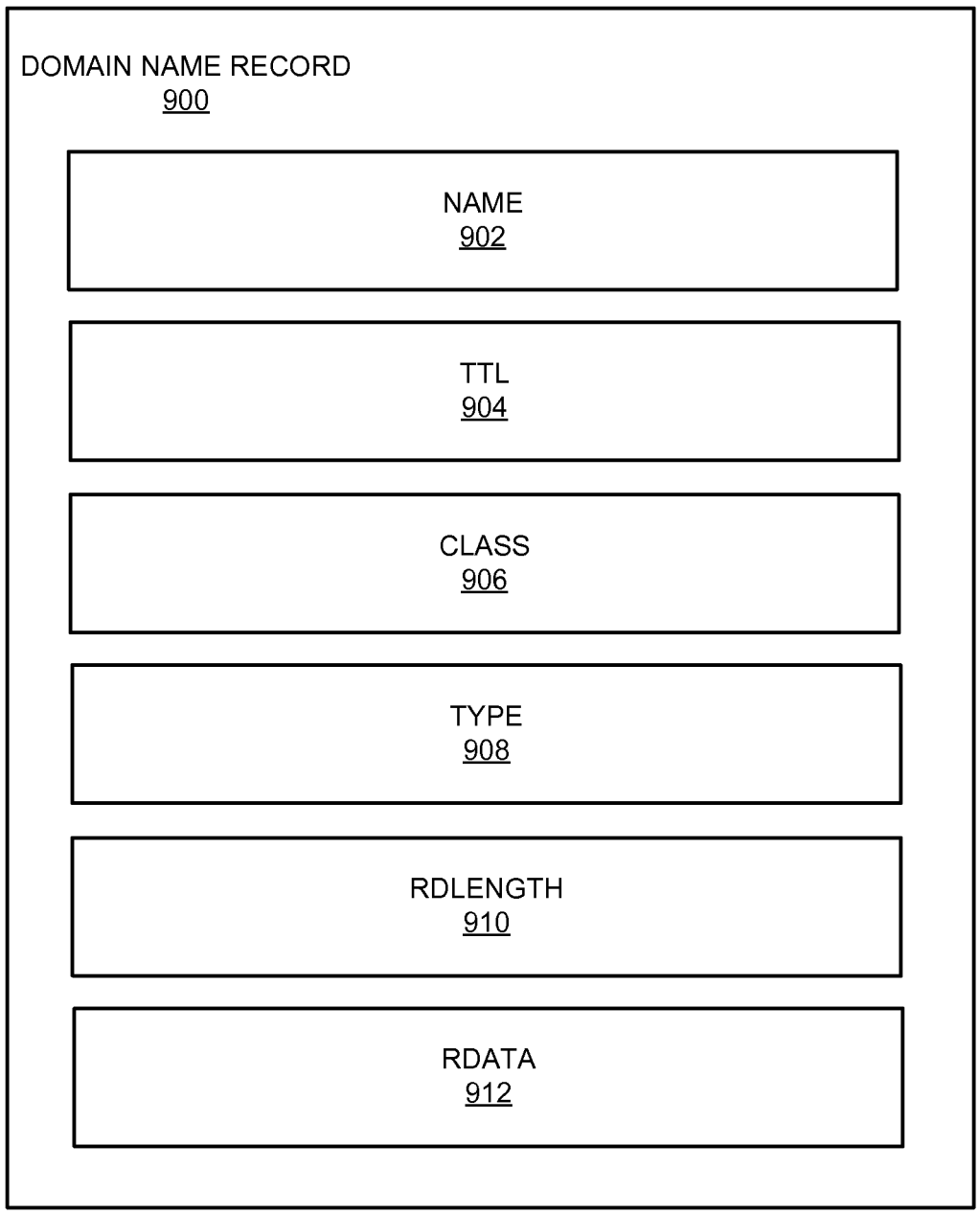
FIG. 8 depicts the structure of an example of a DNS resource record.

FIG. 8 is a block diagram depicting the structure of a domain name resource record that can be stored in the local cache at the recursive DNS clusters. Each resource record includes a name field 902, a TTL field 904, a class field 906, a type field 908, an RDLENGTH field 910 and an RDATA field 912. As earlier described, the TTL field sets the maximum amount of time for maintaining the resource record before it should be treated as invalid and expired. In accordance with one embodiment, the RDATA field is used for various flags that may be set by the recursive nameservers to indicate some additional information about the domain in addition to the standard DNS specified information. A flag can be any indicator, marking or symbol associated with a domain name, such as a binary indicator in part of the RDATA field. The flags may have various functions, including but not limited to marking domain names as suspicious or untrustworthy, such as a web site associated with phishing activities. Flags may be used to indicate various types and levels of information. For information, social networking or pornographic web pages may be flagged so that the nameserver can provide alternate or additional information when a client issues a request.

Figure 9:
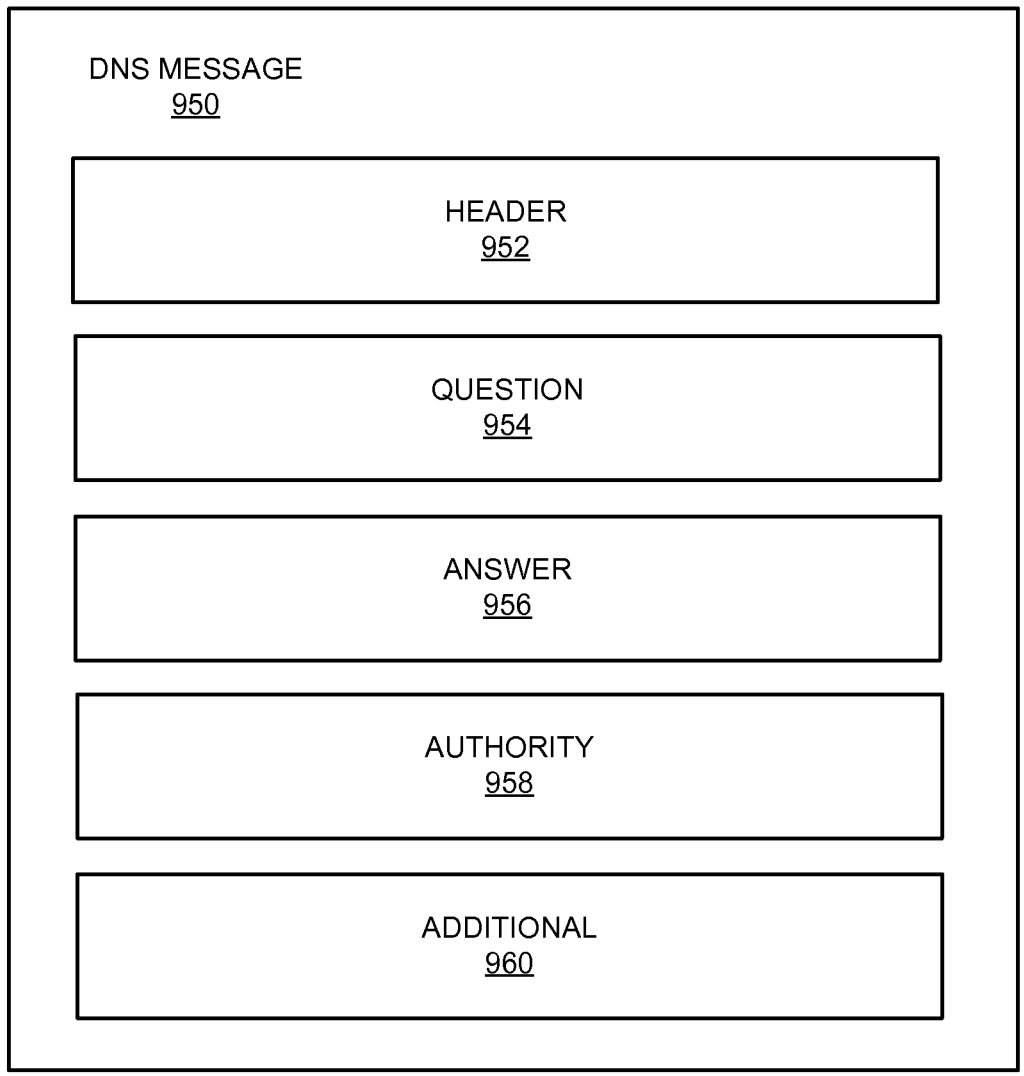
FIG. 9 depicts the structure of an example of a DNS message.

FIG. 9 is a block diagram depicting the structure of a DNS message response or request 950. A DNS message includes a header field 952, a question field 954, an answer field 956, an authority field 958 and an additional field 960. The question field indicates the question for (or request) of the name server in a DNS request. The answer field in a DNS response includes one or more resource records answering a question from a DNS request. The authority field includes one or more resource records pointing to an authority. The additional field is structured like a resource record and can include various types of information, such as the subscriber identifier as described above.

Figure 10:
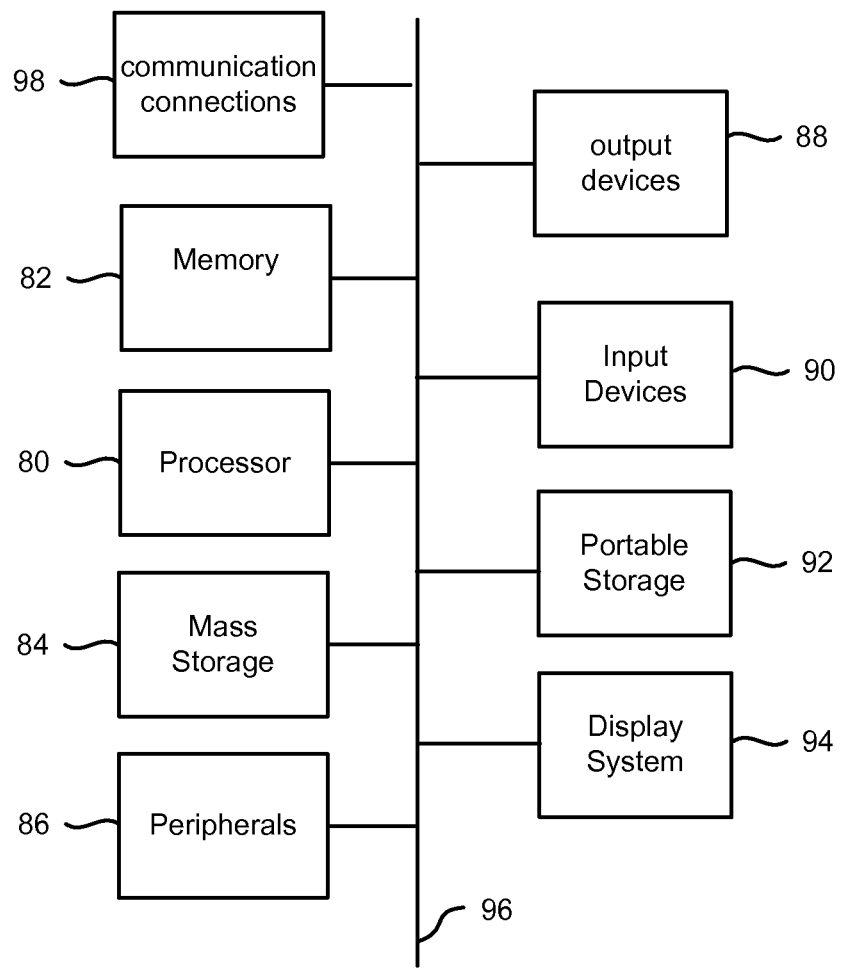
FIG. 10 is a simplified block diagram of a computing device that can be used to implement various embodiments of the disclosed technology.

FIG. 10 is a high level block diagram of a computing system which can be used to implement any of the computing devices of FIG. 3. The computing system of FIG. 10 includes processor 80, memory 82, mass storage device 84, peripherals 86, output devices 88, input devices 90, portable storage 92, and display system 94. For purposes of simplicity, the components shown in FIG. 0 are depicted as being connected via a single bus 96. However, the components may be connected through one or more data transport means. In one alternative, processor 80 and memory 82 may be connected via a local microprocessor bus, and the mass storage device 84, peripheral device 86, portable storage 92 and display system 94 may be connected via one or more input/output buses.

Processor 80 may contain a single microprocessor, or may contain a plurality of microprocessors for configuring the computer system as a multiprocessor system. Memory 82 stores instructions and data for programming processor 80 to implement the technology described herein. In one embodiment, memory 82 may include banks of dynamic random access memory, high speed cache memory, flash memory, other nonvolatile memory, and/or other storage elements. Mass storage device 84, which may be implemented with a magnetic disc drive or optical disc drive, is a nonvolatile storage device for storing data and code. In one embodiment, mass storage device 84 stores the system software that programs processor 80 to implement the technology described herein. Portable storage device 92 operates in conjunction with a portable nonvolatile storage medium, such as a floppy disc, CD-RW, flash memory card/drive, etc., to input and output data and code to and from the computing system of FIG. 10. In one embodiment, system software for implementing embodiments is stored on such a portable medium, and is input to the computer system via portable storage medium drive 92.

Peripheral devices 86 may include any type of computer support device, such as an input/output interface, to add additional functionality to the computer system. For example, peripheral devices 86 may include one or more network interfaces for connecting the computer system to one or more networks, a modem, a router, a wireless communication device, etc. Input devices 90 provide a portion of a user interface, and may include a keyboard or pointing device (e.g. mouse, track ball, etc.). In order to display textual and graphical information, the computing system of FIG. 9 will (optionally) have an output display system 94, which may include a video card and monitor. Output devices 88 can include speakers, printers, network interfaces, etc. Device 100 may also contain communications connection(s) 112 that allow the device to communicate with other devices via a wired or wireless network. Examples of communications connections include network cards for LAN connections, wireless networking cards, modems, etc. The communication connection(s) can include hardware and/or software that enables communication using such protocols as DNS, TCP/IP, UDP/IP, and HTTP/HTTPS, among others.

The components depicted in the computing system of FIG. 10 are those typically found in computing systems suitable for use with the technology described herein, and are intended to represent a broad category of such computer components that are well known in the art. Many different bus configurations, network platforms, operating systems can be used. The technology described herein is not limited to any particular computing system.

The technology described herein, including the identification and block page services, can be implemented using hardware, software, or a combination of both hardware and software. The software used is stored on one or more of the processor readable storage devices described above (e.g., memory 82, mass storage 84 or portable storage 92) to program one or more of the processors to perform the functions described herein. The processor readable storage devices can include computer readable media such as volatile and nonvolatile media, removable and non-removable media. By way of example, and not limitation, computer readable media may comprise computer readable storage media and communication media. Computer readable storage media may be implemented in any method or technology for storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

In alternative embodiments, some or all of the software can be replaced by dedicated hardware including custom integrated circuits, gate arrays, FPGAs, PLDs, and special purpose computers. In one embodiment, software (stored on a storage device) implementing one or more embodiments is used to program one or more processors. The one or more processors can be in communication with one or more computer readable media/storage devices, peripherals and/or communication interfaces. In alternative embodiments, some or all of the software can be replaced by dedicated hardware including custom integrated circuits, gate arrays, FPGAs, PLDs, and special purpose computers.

The foregoing detailed description has been presented for purposes of illustration and description. It is not intended to be exhaustive or to limit the invention to the precise form disclosed. Many modifications and variations are possible in light of the above teachings. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method of processing communication in a computer network, comprising:

processing network traffic by web server or a nameserver to determine information related to requests from a plurality of clients for a plurality of domains, the information including for each client a set of domains associated with requests from the client and including for each domain a set of clients associated with requests for the domain;

generating by an application server security rankings for the plurality of clients based on a predetermined classification for one or more of the plurality of domains and an iterative determination using a security ranking for the plurality of domains, wherein the security ranking for each client is determined from the set of domains associated with the client;

generating by the application server the security rankings for the plurality of domains based on the security ranking for the plurality of clients, wherein the security ranking for each domain is based on the security rankings of the set of clients associated with requests for the each domain;

generating by the application server a domain classification for the plurality of domains based on the security rankings of the plurality of domains; and processing additional network traffic by the web server or the nameserver using the domain classification for the plurality of domains.

2. A method according to claim 1, wherein processing additional network traffic comprises:

receiving a plurality of domain name system (DNS) requests at the nameserver from the plurality of clients for the plurality of domains; and generating a plurality of DNS replies at the nameserver for the plurality of DNS requests based on the domain classification for the plurality of domains.

3. A method according to claim 2, wherein generating a domain classification for the plurality of domains comprises:

determining for each domain whether the security ranking for the each domain indicates an association with malware; and updating domain name information for a first domain having a security ranking beyond a threshold.

4. A method according to claim 3, wherein:

the plurality of DNS requests includes a first DNS request for domain name information associated with the first domain; and generating the plurality of DNS replies includes generating a first DNS reply for the first DNS request including domain name information associated with an alternate domain in response to the domain name information for the first domain.

5. A method according to claim 4, wherein:

the domain name information for the alternate domain is associated with a block page service including the web server.

6. A method according to claim 1, wherein processing additional network traffic comprises:

receiving at the web server a plurality of resource requests from the plurality of clients, the plurality of resource requests being associated with the plurality of domains; and generating at the web server a plurality of replies for the plurality of resource requests based on the domain classification for the plurality of domains.

7. A method according to claim 1, further comprising:

iteratively generating the security rankings for the plurality of clients and the security rankings for the plurality of domains;

wherein the security ranking for each client is based on a reciprocal determination from the security rankings of the set of domains associated with the each client; and wherein the security ranking for each domain is based on a reciprocal determination for the security rankings of the set of clients associated with the each domain.

8. A method according to claim 7, wherein:

iteratively generating the security ranking for each client comprises aggregating the security ranking for each domain in the set of domains associated with the each client; and iteratively generating the security ranking for each domain comprises aggregating the security ranking for each client in the set of clients associated with the each domain.

9. A method according to claim 8, wherein:

iteratively generating the security ranking for each client comprises testing for convergence of the security ranking for the each client; and iteratively generating the security ranking for each domain comprises testing for convergence of the security ranking for the each domain.

10. A method according to claim 9, wherein:

testing for convergence of the security ranking for each client comprises determining whether a change in the security ranking for the each client is within a threshold between iterations; and testing for convergence of the security ranking for each domain comprises determining whether a change in the security ranking for the each domain is within a threshold between iterations.

11. A method of managing user requests for domain-related resources, comprising:

accessing information related to network requests from a plurality of clients for a plurality of domains, the information including for each client a set of domains associated with network requests from the each client and including for each domain a set of clients associated with network requests for the each domain;

generating a security ranking for the plurality of clients, the security ranking generated for each client being based on the set of domains associated with the each client;

generating a security ranking for the plurality of domains, the security ranking generated for each domain is based on aggregating the security racking for each client associated with requests for the each domain;

receiving by a web server or an application server a first network request associated with a first domain of the plurality of domains; and generating by the web server or the application server a first reply to the first network request associated with the first domain based on the security ranking of the first domain.

12. A method according to claim 11, wherein generating a security ranking for each domain includes, for each domain:

determining a security ranking for each client in the set of clients associated with network requests for the each domain;

modifying the security ranking for each client based on a number of domains associated with the each client; and wherein aggregating the security ranking for each client includes aggregating the modified security ranking for each client to generate the security ranking for the each domain.

13. A method according to claim 11, further comprising:

generating domain name information for the plurality of domains based on the security ranking generated for each domain, wherein the domain name information for the first domain is generated based on the security ranking for the first domain to indicate that the first domain is associated with malware.

14. A method according to claim 13, wherein:

generating the security ranking for each client includes recursively generating the security ranking on a numerical scale with four or more possible values.

15. A method according to claim 13, wherein:

the first network reply to the first network request associated with the first domain includes a resource from an alternate domain.

16. A computer readable storage medium having computer readable instructions for programming a processor to perform a method of domain classification, the method comprising:

accessing information related to network requests from a plurality of clients for a plurality of domains, the information including a group of domains associated with each client and a group of clients associated with each domain, the plurality of domains including a first set of domains having a known security classification and a second set of domains having an unknown security classification;

initializing a security ranking for the first set of domains based on the known security classification;

iteratively generating a security ranking for the plurality of clients, the security ranking generated for each client being based on the security rankings of each domain in the group of domains associated with the each client, wherein iteratively generating the security ranking for each client comprises testing for convergence of the security ranking for the each client;

iteratively generating a security ranking for the plurality of domains, the security ranking generated for each domain being based on the security rankings of each client in the group of clients associated with the each domain; and generating a domain classification for the second set of domains based on a corresponding security ranking; and processing network traffic by a web server or a nameserver using the domain classification for the second set of domains.

17. A computer readable storage medium according to claim 16, wherein processing network traffic comprises:

receiving at the nameserver a plurality of domain name system (DNS) requests from the plurality of clients for the plurality of domains; and generating by the nameserver a plurality of DNS replies for the plurality of DNS requests based on the domain classification for the second set of the plurality of domains.

18. A computer readable storage medium according to claim 17, wherein generating a domain classification for the second set of domains comprises:

determining for each domain in the second set of domains whether the security ranking for the each domain indicates an association with malware; and updating domain name information for a first domain having a security ranking beyond a threshold.

19. A computer readable storage medium according to 18, wherein:

the plurality of DNS requests includes a first DNS request for domain name information associated with the first domain; and generating the plurality of DNS replies includes generating a first DNS reply for the first DNS request including domain name information associated with an alternate domain in response to the domain name information for the first domain.

20. A computer readable storage medium according to claim 19, wherein:

the domain name information for the alternate domain is associated with a block page service at the web server.

21. A computer readable storage medium according to claim 16, wherein processing network traffic comprises:

receiving at the web server a plurality of resource requests from the plurality of clients, the plurality of resource requests being associated with the plurality of domains; and generating by the web server a plurality of replies for the plurality of resource requests based on the domain classification for the second set of domains.

22. A computer readable storage medium according to claim 16, wherein:

the security ranking for each client is based on a reciprocal determination from the security rankings of the list of domains associated with the each client; and the security ranking for each domain is based on a reciprocal determination for the security rankings of the list of clients associated with the each domain.

23. A system for generating domain information, comprising:

at least one storage device including information related to network requests from a plurality of clients for a plurality of domains, the information including for each client a group of domains associated with requests from the client and including for each domain a group of clients associated with requests for the domain; and a processor in communication with the at least one storage device, the processor executes computer readable instructions to generate security rankings for the plurality of clients based on a predetermined classification of a first set of the plurality of domains, generate security rankings for the plurality of domains based on the security ranking for the plurality of clients, generate a domain classification for a second set of the plurality of domains based on the security rankings of the second set of the plurality of domains, and process network traffic using the domain classification for the second set of the plurality of domains;

wherein the security ranking for each client is determined from the group of domains associated with the client; and wherein the security ranking for each domain is based on a summation of the security rankings of the group of clients associated with requests for the each domain.

24. A system according to claim 23, further comprising:

at least one recursive DNS nameserver in communication with subscriber information and the domain classifications for the second set of the plurality of domains;

wherein the at least one recursive DNS nameserver receives a first request for domain name information for a first domain in the second set of domains and generates a reply with domain name information for an alternate domain based on the domain classification for the first domain.

* * * * *